United States Patent
Isono et al.

(10) Patent No.: US 8,728,638 B2
(45) Date of Patent: May 20, 2014

(54) MAGNETIC DISK SUBSTRATE, METHOD FOR MANUFACTURING THE SAME, AND MAGNETIC DISK

(75) Inventors: Hideki Isono, Shinjuku-ku (JP); Hiroshi Tsuchiya, Shinjuku-ku (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/001,974

(22) PCT Filed: Jun. 29, 2009

(86) PCT No.: PCT/JP2009/061822
§ 371 (c)(1),
(2), (4) Date: Dec. 29, 2010

(87) PCT Pub. No.: WO2010/001844
PCT Pub. Date: Jan. 7, 2010

(65) Prior Publication Data
US 2011/0102945 A1    May 5, 2011

(30) Foreign Application Priority Data
Jun. 30, 2008 (JP) ................................. 2008-171444

(51) Int. Cl.
| G11B 5/82 | (2006.01) |
| C03C 19/00 | (2006.01) |
| G11B 5/73 | (2006.01) |
| C03C 15/00 | (2006.01) |

(52) U.S. Cl.
CPC ................ G11B 5/7315 (2013.01); G11B 5/82 (2013.01)
USPC ....... 428/846.9; 428/848.8; 65/30.1; 360/135

(58) Field of Classification Search
CPC ................................ G11B 5/7315; G11B 5/82
USPC ................ 428/213, 848, 848.1, 848.4, 848.6, 428/848.8, 848.9, 831, 846.3, 846.1, 846.2, 428/846.9, 847.1, 64.5; 65/411, 33.4, 146; 501/70; 427/402, 373.2, 127, 129, 523; 360/135
See application file for complete search history.

(56) References Cited

U.S. PATENT DOCUMENTS

| 2005/0249984 A1* | 11/2005 | Ohmori et al. | 428/848 |
| 2006/0216552 A1* | 9/2006 | Ikenishi et al. | 428/848.8 |
| 2007/0048553 A1* | 3/2007 | Nakano et al. | 428/848.6 |
| 2007/0202312 A1* | 8/2007 | Kim et al. | 428/848.6 |

FOREIGN PATENT DOCUMENTS

| JP | 7-134823 A | 5/1995 |
| JP | 10-172191 A | 6/1998 |

(Continued)

OTHER PUBLICATIONS

Machine translation JP 10-194787 noted as JP 2998952, Jun. 1998.*

*Primary Examiner* — Kevin M. Bernatz
*Assistant Examiner* — Louis Falasco
(74) *Attorney, Agent, or Firm* — Sughrue Mion, PLLC

(57) ABSTRACT

Provided are a magnetic disk substrate that can be adapted to a reduction in flying height of a head in an HDD and to an increase in rotational speed therein, and a method of manufacturing such a substrate.

In an annular glass substrate for a magnetic recording medium, a main surface (12) of the glass substrate is uniformly inclined from an inner peripheral end (13) to an outer peripheral end (14) and has an isotropic shape with respect to an axis passing through the center of the glass substrate. That is, it is rotationally symmetric with respect to an arbitrary angle rotation about the axis passing through the center of the glass substrate.

9 Claims, 1 Drawing Sheet

(56) References Cited

FOREIGN PATENT DOCUMENTS

| JP | 10-194787 A | 7/1998 |
| JP | 10-302251 A | 11/1998 |
| JP | 11-268932 A | 10/1999 |
| JP | 2000-348330 A | 12/2000 |
| JP | 2003-109212 A | 4/2003 |
| JP | 2003-157521 A | 5/2003 |

* cited by examiner

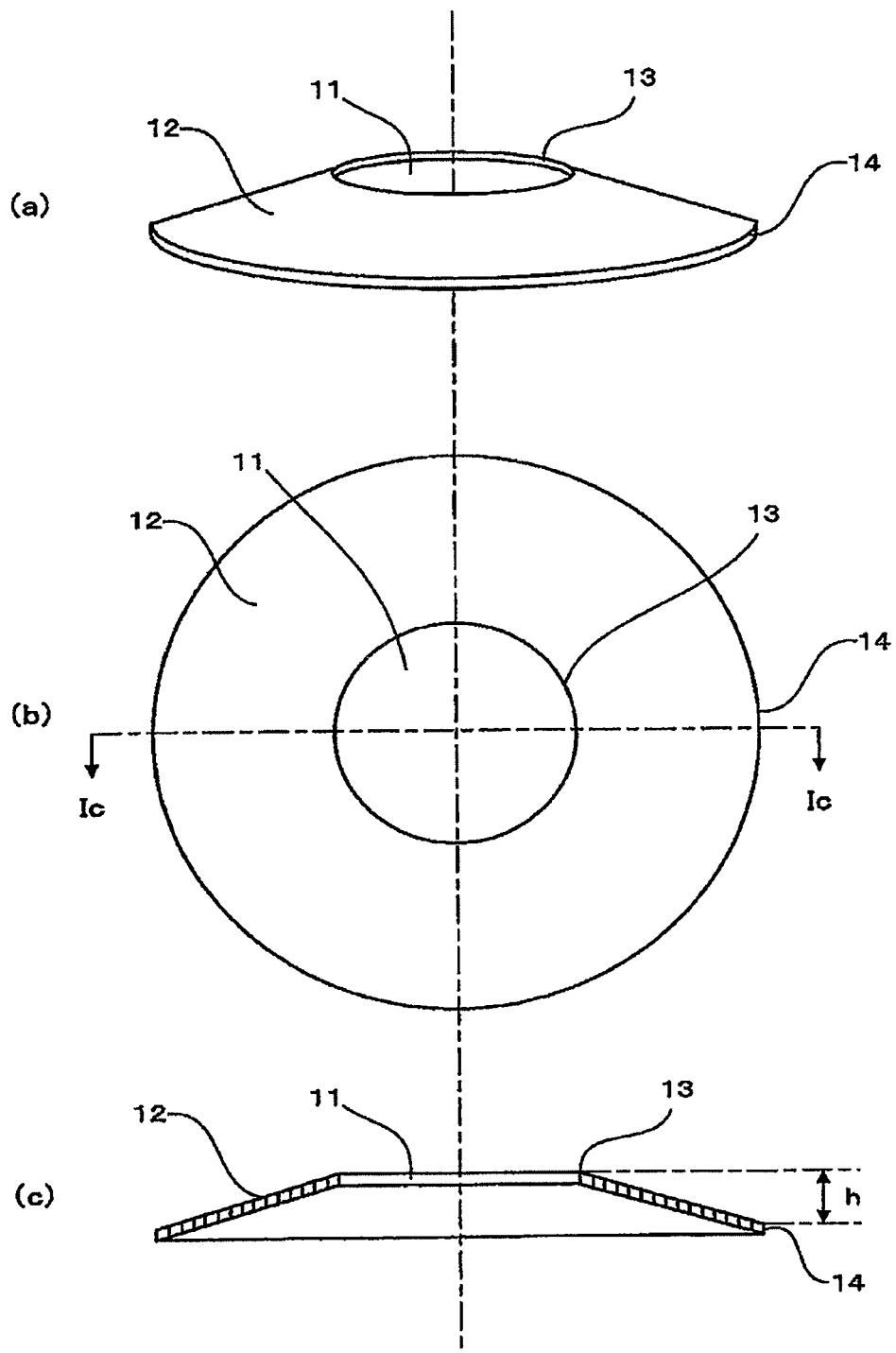

MAGNETIC DISK SUBSTRATE, METHOD FOR MANUFACTURING THE SAME, AND MAGNETIC DISK

TECHNICAL FIELD

This invention relates to a magnetic disk substrate for use as a recording medium of a computer or the like, a method of manufacturing the same, and a magnetic disk.

BACKGROUND ART

Conventionally, aluminum substrates have been widely used as substrates for magnetic disks being one of magnetic recording media for use in hard disk drives (HDDs) and the like. However, following the reduction in size and thickness and the increase in recording density of magnetic disks, glass substrates excellent in substrate surface flatness and substrate strength as compared with the aluminum substrates have been gradually replacing them.

Normally, a glass magnetic disk substrate is manufactured through the following processes.

(1) First Lapping Process (process for making uniform the thickness of a glass base plate)

(2) Shaping Process (process for shaping the glass base plate into an annular glass substrate and chamfering end faces)

(3) Second Lapping Process (process for removing fine irregularities formed on main surfaces in the shaping process)

(4) Surface Polishing Process (process for polishing the main surfaces of the glass substrate; there are first and second polishing processes if necessary)

(5) Chemical Strengthening Process (process for strengthening the strength of the glass substrate)

In the above-mentioned manufacturing processes of the magnetic disk glass substrate, the chemical strengthening process is carried out for increasing the strength of the glass substrate, if necessary. For example, when an aluminosilicate glass is used as the glass substrate, $Li^+$ ions or the like present on the glass surfaces are ion-exchanged with larger ions (e.g. $Na^+$ ions, $K^+$ ions, or the like) by immersing the glass substrate in a predetermined solution. Compressive stress is generated on the ion-exchanged glass surfaces so that the strength of the glass substrate can be increased. Normally, an area (compressive stress layer) where the compressive stress is generated by the chemical strengthening treatment is at most about 100 μm from the glass substrate surfaces.

Hitherto, since higher flying stability of recording/reproducing heads in HDDs has been required, the technique has been developed aiming at more flattening surfaces of HDD glass substrates. However, if only the flatness is simply pursued, there has been a problem that when a glass substrate after processing is slightly saddle-shaped, a flying recording/reproducing head swings up and down to follow it so that the flying of the head becomes unstable. Herein, the saddle shape means a shape like a saddle for use in horse riding and represents a shape that is bent in one direction along a certain diameter as an axis and is further bent in the opposite direction along a diameter perpendicular to the certain diameter, as an axis.

Even if no chemical strengthening treatment is carried out, variation in stress distribution may occur due to the flatness of surface plates used in processing a glass substrate so that the glass substrate may have a saddle shape. Further, there has been a problem that even if a flat glass substrate is obtained without carrying out chemical strengthening treatment, uneven forces may be applied to the inner diameter of the substrate during clamping and, as a result, surfaces of the substrate after incorporation into an HDD may be bent into a saddle shape.

Conventionally, such abnormality in shape did not affect the characteristics of an HDD and thus has not particularly been a problem. However, following the reduction in flying height of a head for achieving higher HDD recording density and the increase in rotational speed for achieving shorter read/write time in recent years, there has been a possibility of affecting the characteristics of an HDD.

With respect to such waviness of the surfaces of the magnetic disk glass substrate, there has been proposed a method of solving it by polishing the substrate surfaces under specific conditions (e.g. Patent Document 1).

PRIOR ART DOCUMENT

Patent Document

Patent Document 1: JP-A-2000-348330

SUMMARY OF THE INVENTION

Problem to be Solved by the Invention

However, with the above-mentioned conventional method, although it is possible to improve microwaviness of the glass substrate surfaces, it is difficult to solve the abnormality in overall shape such that the glass substrate is slightly saddle-shaped.

In view of the above-mentioned conventional problems, it is an object of this invention to provide a magnetic disk substrate and its manufacturing method, which can control the shape of the magnetic disk glass substrate, thus enabling adaptation to a reduction in flying height of a head in an HDD and to an increase in rotational speed therein in recent years.

Means for Solving the Problem

In order to achieve the above-mentioned object, the present inventors have considered that, not by flattening the shape of a magnetic disk glass substrate as conventionally done, but by positively bending it in one direction, the shape of the glass substrate is stabilized and, when it is incorporated into an HDD as a magnetic disk, the distance between a head and the magnetic disk in the circumferential direction is maintained constant.

As a result of intensive studies, by calculating a predetermined compressive stress difference with respect to two main surfaces of an HDD glass substrate and accurately controlling this stress difference, there was obtained a substrate having a shape which was rotationally symmetric about an axis passing through the center of the substrate and in which a cross-section of the substrate was warped to one of the main surface sides.

Further, by setting the main surface roughness to 0.15 nm or less, the distance between a head and a magnetic disk in the circumferential direction was maintained constant to a high degree, thus being capable of being applied even to an HDD in which high-level accuracy of a head and a medium is required such that a storage capacity of 250 GB or more is provided per medium in a 2.5-inch HDD.

Specifically, a magnetic disk substrate according to this invention is a magnetic disk substrate characterized by having annular main surfaces, wherein the substrate has an isotropic shape with respect to an axis passing through a center of the main surface and, given that a direction of the axis is height, a change amount in height of the main surface in a radial direction is monotone increasing from an inner peripheral end to an outer peripheral end of the main surface, and a surface roughness of the main surface is 0.15 nm or less. Herein, the isotropic shape with respect to the axis passing through the center is a shape which is rotationally symmetric with respect to an arbitrary angle rotation about the axis passing through the center of the glass substrate.

In the above-mentioned magnetic disk substrate, it is preferable that the main surface is highest at the inner peripheral end thereof and lowest at the outer peripheral end thereof. A difference in height between a highest position and a lowest position of the main surface may be 0.3 µm or more and 10 µm or less. At least one of the main surfaces may have a compressive stress layer and compressive stress values may be different between the two main surfaces and further, the substrate preferably has a bending strength of 5 kgf or more.

Further, a magnetic disk substrate manufacturing method according to this invention, characterized by comprising a step of chemically strengthening an annular glass substrate and a step of polishing two main surfaces of the glass substrate chemically strengthened, wherein thicknesses of removal, by polishing, of the two main surfaces are made different from each other.

According to this method, the shape of the glass substrate can be stabilized and, further, it is possible to obtain a magnetic disk glass substrate which, when it is incorporated into an HDD as a magnetic disk, allows the distance between a head and the magnetic disk in the circumferential direction to be maintained constant.

Further, a magnetic disk according to this invention is characterized by comprising the above-mentioned magnetic disk substrate and a magnetic layer formed on the magnetic disk substrate directly or through another layer. According to this structure, the shape of the magnetic disk can be stabilized and, further, when it is incorporated into an HDD, the distance between a head and the magnetic disk in the circumferential direction can be maintained constant.

Effect of the Invention

A magnetic disk glass substrate according to this invention is a magnetic disk substrate having annular main surfaces, wherein the substrate has an isotropic shape with respect to an axis passing through the center of the main surface and, given that a direction of the axis is height, the height of the main surface changes in a radial direction and the surface roughness of the main surface is 0.15 nm or less.

As a result, the shape of the glass substrate can be stabilized and, further, when it is incorporated into an HDD as a magnetic disk, the distance between a head and the magnetic disk in the circumferential direction can be maintained constant. Therefore, it is possible to obtain a magnetic disk that can be adapted to a reduction in flying height of a head in an HDD and to an increase in rotational speed therein in recent years.

BRIEF DESCRIPTION OF THE DRAWING

FIG. 1 is a diagram showing an external appearance of a magnetic disk in an embodiment of this invention.

MODE FOR CARRYING OUT THE INVENTION

Hereinbelow, an embodiment of this invention will be described in detail with reference to the accompanying drawing. FIG. 1 is a diagram for explaining the structure of a magnetic disk glass substrate (hereinafter referred to as a glass substrate) according to this embodiment. FIG. 1 (a) is a perspective view of the glass substrate, FIG. 1 (b) is a plan view thereof, and FIG. 1 (c) is a cross-sectional view taken along line Ic-Ic of FIG. 1 (b).

As shown in FIG. 1 (a) to (c), the glass substrate according to this embodiment has an annular shape with a circular-shaped hole (hereinafter referred to as a "circular hole") 11 formed in the center of a disk-shaped glass substrate. A main surface 12 of the glass substrate is uniformly inclined from an inner peripheral end 13 to an outer peripheral end 14 and has an isotropic shape with respect to an axis passing through the center of the glass substrate. That is, it is rotationally symmetric with respect to an arbitrary angle rotation about the axis passing through the center of the glass substrate.

Accordingly, in FIG. 1 (c) being the cross-sectional view taken along the line Ic-Ic, a cross-section of the main surface 12 is straight lines with a constant inclination and is laterally symmetrical. Further, a cross-section in any perpendicular plane that passes through the center of the glass substrate has the same shape as that in FIG. 1 (c).

With such a shape, when a magnetic disk is manufactured using this glass substrate and incorporated into an HDD, since the height of a main surface of the magnetic disk in the circumferential direction is constant, even if the magnetic disk is rotated, the distance between a magnetic head and the magnetic disk is easily maintained constant so that it is possible to realize a reduction in flying height of the magnetic head and an increase in rotational speed of the magnetic disk.

In terms of the error rate of the medium, the surface roughness of the main surface 12 of the glass substrate is preferably 0.15 nm or less.

Further, given that the direction of the above-mentioned axis is height, a difference (h in FIG. 1 (c)) between the highest position and the lowest position of the main surface 12 is preferably 0.3 µm or more and 10 µm or less. If it is less than 0.3 µm, there is a case where the shape of the substrate becomes unstable when an impact is applied to the substrate during high-speed rotation, so that it becomes difficult to read a signal at an outermost peripheral portion of the disk. On the other hand, if it is greater than 10 µm, there is a case where it becomes difficult to read a signal when the head performs a seek operation.

In the above-mentioned embodiment, the example is shown in FIG. 1 (c) in which the main surface 12 forms the straight lines. However, it is sufficient that the change amount is monotone increasing, and therefore, the main surface 12 may form, for example, curves with a predetermined radius of curvature.

Hereinbelow, a magnetic disk glass substrate manufacturing method according to this embodiment will be described. The glass substrate according to this embodiment is manufactured through the following processes.

(1) First Lapping Process (process for making uniform the thickness of a glass base plate)

(2) Shaping Process (process for shaping the glass base plate into an annular glass substrate and chamfering end faces)

(3) Second Lapping Process (process for removing fine irregularities formed on main surfaces in the shaping process)

(4) Chemical Strengthening Process (process for strengthening the strength of the glass substrate)

(5) Surface Polishing Process (process for polishing the main surfaces of the glass substrate; there are first and second polishing processes if necessary)

In the manufacturing processes of the glass substrate according to this embodiment, the surface precision polishing process is carried out after the chemical strengthening process. By providing a difference in compressive stress value between the two main surfaces through these processes, the substrate of a desired shape can be obtained.

Example 1

Hereinbelow, a description will be given of an Example which was carried out for clarifying the effect of this invention. In this Example, a magnetic disk glass substrate and a magnetic disk were manufactured through the following processes. In the following description, a description will be given of an example of manufacturing the magnetic disk glass substrate and the magnetic disk of 2.5 inches. However, the size of the magnetic disk glass substrate and the magnetic disk is not particularly limited and may be, for example, 1.8 inches, 1 inch, or 3.5 inches.

(1) Shaping Process and First Lapping Process

In a magnetic disk substrate manufacturing method according to this Example, first, lapping (grinding) is applied to surfaces of a plate-like glass to obtain a glass base member, then this glass base member is cut, thereby cutting out a glass disk. As the plate-like glass, one of various plate-like glasses can be used. This plate-like glass can be manufactured by a known manufacturing method such as a press method, a float method, a downdraw method, a redraw method, or a fusion method using, for example, a molten glass as a material. If the press method is used among them, the plate-like glass can be manufactured at low cost. As a material property of the plate-like glass, use can be made of an amorphous glass or a glass ceramic (crystallized glass). As a material of the plate-like glass, use can be made of an aluminosilicate glass, a sodalime glass, a borosilicate glass, or the like. Particularly as the amorphous glass, the aluminosilicate glass can be preferably used in terms of capability of being chemically strengthened and capability of providing a magnetic disk substrate which is excellent in main surface flatness and substrate strength.

In this Example, a molten aluminosilicate glass was molded into a disk shape by direct pressing using upper, lower, and drum molds, thereby obtaining an amorphous plate-like glass. As the aluminosilicate glass, use was made of a glass containing, as main components, $SiO_2$: 58 to 75 wt %, $Al_2O_3$: 5 to 23 wt %, $Li_2O$: 3 to 10 wt %, and $Na_2O$: 4 to 13 wt %.

Then, lapping was applied to both main surfaces of the plate-like glass, thereby obtaining a disk-shaped glass base member. The lapping was carried out using a double-side lapping machine employing a planetary gear mechanism with the use of alumina-based free abrasive particles. Specifically, the lapping was carried out by pressing lapping surface plates onto both surfaces of the plate-like glass from the upper and lower sides, supplying a grinding liquid containing the free abrasive particles onto the main surfaces of the plate-like glass, and relatively moving the plate-like glass and the surface plates to each other. By this lapping, the glass base member having the flat main surfaces was obtained.

(2) Cutting-Out Process (Coring, Forming, Chamfering)

Then, the glass base member was cut using a diamond cutter, thereby cutting out a disk-shaped glass substrate from the glass base member. Then, using a cylindrical diamond drill, an inner hole was formed at a central portion of the glass substrate, thereby obtaining an annular glass substrate (coring). Then, grinding was applied to an inner peripheral end face and an outer peripheral end face using diamond grindstones, thereby carrying out predetermined chamfering (forming, chamfering).

(3) Second Lapping Process

Then, second lapping was applied to both main surfaces of the obtained glass substrate in the same manner as in the first lapping process. By carrying out this second lapping process, fine irregularities formed on the main surfaces in the cutting-out process or an end face polishing process as a preceding process can be removed in advance, so that it becomes possible to complete a subsequent main surface polishing process in a short time.

(4) End Face Polishing Process

Then, the outer peripheral end face and the inner peripheral end face of the glass substrate were mirror-polished by a brush polishing method. In this event, as polishing abrasive particles, use was made of a slurry (free abrasive particles) containing cerium oxide abrasive particles.

Then, the glass substrate having been subjected to the end face polishing process was washed with water. By this end face polishing process, the end faces of the glass substrate were finished to a mirror surface state that can prevent precipitation of sodium and potassium.

(5) Main Surface Polishing Process

A first polishing process was first carried out as a main surface polishing process. This first polishing process mainly aims to remove cracks or strains remaining on the main surfaces during the first and second lapping processes. In the first polishing process, hard urethane-based pads were used as polishing pads and, as a polishing liquid, use was made of a polishing liquid in the form of a mixture of water and cerium oxide polishing abrasive particles.

(6) Chemical Strengthening Process

Then, chemical strengthening was applied to the glass substrate having been subjected to the above-mentioned lapping processes and polishing processes. The chemical strengthening was carried out by preparing a chemical strengthening solution in the form of a mixture of potassium nitrate (60%) and sodium nitrate (40%), heating this chemical strengthening solution to 400° C. and preheating the cleaned glass substrate to 300° C., and immersing it in the chemical strengthening solution for about 3 hours. The immersion was carried out in the state where a plurality of glass substrates were placed in a holder so as to be held at their end faces, thereby enabling the entire surfaces of the glass substrates to be chemically strengthened.

By carrying out the immersion treatment in the chemical strengthening solution as described above, lithium ions and sodium ions in a surface layer of the glass substrate are replaced by sodium ions and potassium ions in the chemical strengthening solution, respectively, so that the glass substrate is strengthened. The thickness of a compressive stress layer formed at the surface layer of the glass substrate was about 100 μm.

The glass substrate having been subjected to the chemical strengthening treatment was immersed in a water bath at 20° C. so as to be rapidly cooled and was maintained for about 10 minutes. Then, the rapidly cooled glass substrate was immersed in 10 wt % sulfuric acid heated to about 40° C., so as to be cleaned. Further, the glass substrate having been subjected to the sulfuric acid cleaning was immersed in respective cleaning baths of pure water and IPA in turn so as to be cleaned.

(7) Mirror Polishing Process

Then, a second polishing process (mirror polishing process) was carried out. The second polishing process is a process for further polishing the glass substrate having been subjected to the first polishing, thereby mirror-finishing the main surfaces 12 of the glass substrate. In the second polishing process, polyurethane-based soft polisher polishing pads were used and, as a polishing liquid, use was made of a mixed solution obtained by adding colloidal silica particles to ultra-pure water. The removal thicknesses (machining amounts) of both surfaces 12 of the glass substrate were set to 0.3 μm for surface A and 0.5 μm for surface B. The glass substrate having been subjected to the second polishing process was cleaned by a normal method, thereby obtaining a magnetic disk glass substrate according to this Example.

The bending strength of this magnetic disk glass substrate was measured using a bending strength measuring and testing apparatus (Shimadzu Autograph DDS-2000) and, as a result, it was 11 kgf.

Comparative Example 1

Herein, for comparison with the above-mentioned Example, a glass substrate was manufactured through the conventional manufacturing processes. That is, the glass substrate was manufactured through the same processes as in the Example except that chemical strengthening treatment was carried out after polishing both surfaces of the glass substrate such that machining amounts of surfaces A and B were the same.

[Flatness Measurement]

With respect to the glass substrate according to this Example and the glass substrate as the Comparative Example which were manufactured as described above, the flatness of the main surfaces 12 was measured. Herein, the flatness is a vertical distance (height difference) between the highest portion and the lowest portion of the main surface 12 of the glass substrate. In this Example, a value measured by a flatness measuring apparatus (Optiflat manufactured by KLA-TENCOR corporation) was used as a value of the flatness.

As a result of the measurement, the flatness of the glass substrate according to this Example was 3.1 μm. Further, it was confirmed that the glass substrate had an isotropic shape with respect to an axis passing through the center thereof and that, with respect to surface A, the surface was highest near its inner peripheral end, was lowered as approaching its outer peripheral end, and was lowest near its outer peripheral end. That is, the glass substrate was bent to one side and the change amount in height of the surface was monotone increasing from the inner peripheral end to the outer peripheral end.

On the other hand, with respect to the glass substrate in the Comparative Example, the flatness was 0.5 μm. Further, it was confirmed that the glass substrate had a so-called saddle shape in which the change in height of the surface differed in the circumferential direction and the change along a predetermined diameter and the change along a diameter perpendicular to the predetermined diameter were in opposite directions.

(8) Magnetic Disk Manufacturing Process

On each of both surfaces of each of the glass substrates obtained through the above-mentioned processes, an adhesive layer of a Cr alloy, a soft magnetic layer of a CoTaZr-group alloy, an underlayer of Ru, a nonmagnetic underlayer having a granular structure, a perpendicular magnetic recording layer having a granular structure of a CoCrPt-based alloy, a protective layer of hydrocarbon, and a lubricating layer of perfluoropolyether were formed in this order, thereby manufacturing perpendicular magnetic recording disks. More specifically, an adhesive layer of CrTi, a soft magnetic layer of CoTaZr/Ru/CoTaZr, an intermediate layer of Ru, a nonmagnetic granular underlayer of CoCrSiO$_2$, a granular magnetic layer of CoCrPt—SiO$_2$.TiO$_2$, and a hydrogenated carbon protective film were formed in this order on each glass substrate using an in-line type sputtering apparatus and further a perfluoropolyether lubricating layer was formed by a dipping method, thereby obtaining magnetic disks.

(9) Magnetic Disk Device Manufacturing Process

By incorporating the above-mentioned magnetic disks into devices, magnetic disk devices were manufactured. Since the structure of a magnetic disk device is known, a detailed description thereof is omitted herein.

(Modulation Test)

A modulation test was conducted for the magnetic disks obtained in the Example and the Comparative Example. Specifically, the modulation was measured in an area between distances of 29.9 mm (R1) and 31.5 mm (R2) from the center of the 2.5-inch (outer diameter 65 mmφ) glass substrate.

Specific measurement conditions followed the following sequence (1) to (3).

(1) Set a magnetic disk in an electromagnetic conversion characteristic measuring apparatus (Guzik Technical Enterprise) and, after loading a magnetic head (DFH (dynamic flying height) head with a head flying height (slider flying height) of 9 nm (the flying height of a read element was 2 nm)) on the magnetic disk, write a MF pattern (frequency half a high frequency used for a hard disk).

(2) Input a read signal into an oscilloscope.

(3) Derive a modulation (envelope) per sector at an arbitrary radial position within the above-mentioned range.

As a result, in comparison between the Example and the Comparative Example, modulation values were better (variation width was smaller) in the Example From the above-mentioned modulation test results, it is considered that, with respect to the magnetic disk manufactured using the glass substrate according to the Example, since the glass substrate had the isotropic shape with respect to the axis passing through the center thereof and was bent to one side and the change amount in height of the main surface was monotone increasing from the inner peripheral end to the outer peripheral end, it was possible to maintain constant the distance between the magnetic head and the magnetic disk in the circumferential direction, thus leading to the good results in the modulation test.

On the other hand, it is considered that, with respect to the magnetic disk using the glass substrate according to the Comparative Example, since the glass substrate was saddle-shaped, it was difficult to maintain constant the distance between the magnetic head and the magnetic disk in the circumferential direction and thus the good results were not obtained in the modulation test.

Examples 1 to 8

Comparative Examples 1 to 11

Then, magnetic disk glass substrates according to Examples 2 to 8 and Comparative Examples 2 to 11 were manufactured by changing the processing conditions and, thereafter, magnetic disks were respectively manufactured in the same manner as in Example 1. Then, various tests were conducted for the magnetic disks including the above-mentioned Example 1 and Comparative Example 1. The results thereof are shown in Table 1.

TABLE 1

|  | Monotone Increasing | Flatness/ μm | Isotropic Shape with respect to Axis passing through Center of Main Surface | AFM-Ra (nm) | 400,000-Times L/UL Durability | Film Crack after Impact Test | DFH-TDH at r = 22 mm | Δθ50/° | Modulation Test |
|---|---|---|---|---|---|---|---|---|---|
| Example 1 | Yes | 3.1 | Isotropic | 0.14 | OK | 0 Disk/10 Disks | OK (20 Surfaces) | 2.8 | ⊚ |
| Example 2 | Yes | 0.3 | Isotropic | 0.11 | OK | 0 Disk/10 Disks | OK (20 Surfaces) | 2.2 | ⊚ |
| Example 3 | Yes | 1.0 | Isotropic | 0.12 | OK | 0 Disk/10 Disks | OK (20 Surfaces) | 2.5 | ⊚ |
| Example 4 | Yes | 5.0 | Isotropic | 0.13 | OK | 0 Disk/10 Disks | OK (20 Surfaces) | 2.7 | ⊚ |
| Example 5 | Yes | 9.8 | Isotropic | 0.12 | OK | 0 Disk/10 Disks | OK (20 Surfaces) | 2.5 | ⊚ |
| Comparative Example 1 | No | 0.5 | Anisotropic (saddle-shaped) | 0.13 | OK | 0 Disk/10 Disks | 1 Surface NG/ 20 Surfaces | 2.5 | XX |
| Comparative Example 2 | No | 1.0 | Isotropic | 0.12 | OK | 0 Disk/10 Disks | 3 Surfaces NG/ 20 Surfaces | 2.5 | X |
| Comparative Example 3 | No | 3.0 | Isotropic | 0.13 | OK | 0 Disk/10 Disks | 1 Surface NG/ 20 Surfaces | 2.6 | X |
| Comparative Example 4 | No | 5.0 | Isotropic | 0.13 | OK | 0 Disk/10 Disks | 2 Surfaces NG/ 20 Surfaces | 2.5 | X |
| Comparative Example 5 | No | 9.8 | Isotropic | 0.14 | OK | 0 Disk/10 Disks | 2 Surfaces NG/ 20 Surfaces | 2.9 | X |
| Example 6 | Yes | 11.0 | Isotropic | 0.13 | NG | 0 Disk/10 Disks | OK (20 Surfaces) | 2.9 | ○ |
| Example 7 | Yes | 20.0 | Isotropic | 0.12 | NG | 0 Disk/10 Disks | OK (20 Surfaces) | 2.8 | ○ |
| Example 8 | Yes | 0.1 | Isotropic | 0.13 | OK | 1 Disk/10 Disks | OK (20 Surfaces) | 2.5 | ○ |
| Comparative Example 6 | No | 11.0 | Isotropic | 0.11 | NG | 0 Disk/10 Disks | 2 Surfaces NG/ 20 Surfaces | 2.3 | X |
| Comparative Example 7 | No | 20.0 | Isotropic | 0.12 | NG | 0 Disk/10 Disks | 2 Surfaces NG/ 20 Surfaces | 2.4 | X |
| Comparative Example 8 | No | 0.1 | Isotropic | 0.13 | OK | 2 Disks/10 Disks | OK (20 Surfaces) | 2.5 | X |
| Comparative Example 9 | Yes | 1.1 | Isotropic | 0.18 | OK | 0 Disk/10 Disks | OK (20 Surfaces) | 4.8 | Δ |
| Comparative Example 10 | Yes | 0.8 | Isotropic | 0.25 | OK | 0 Disk/10 Disks | OK (20 Surfaces) | 6.3 | Δ |
| Comparative Example 11 | Yes | 14.8 | Anisotropic (saddle-shaped) | 0.12 | NG | 2 Disks/10 Disks | OK (20 Surfaces) | 2.7 | XX |

"AFM-Ra (nm)" in the table represents a surface roughness (Ra) when a 2 μm×2 μm square measurement area was measured with a resolution of 256×256 pixels using an atomic force microscope.

"400,000-Times L/UL Durability" shows the results of examining the occurrence of data error when a magnetic head repeated a sequence of operations of Load→Disk Outer Periphery→Disk Inner Periphery→Disk Outer Periphery→Unload over the magnetic disk under conditions of a temperature of 70° C. and a humidity of 80%.

"Film Crack after Impact Test" shows the results of confirming whether or not a film of the disk surface was cracked after applying an impact to the substrate in a perpendicular direction under conditions of an action time of 2 msec and an impact of 600 G by dropping a hard disk casing while a DFH head, as described above, performed read/write operations over the rotating magnetic disk in a manner of Outer Periphery→Inner Periphery→Outer Periphery→Inner Periphery→ . . . of the disk. From the results, it is seen that the film was cracked when the warp upon impact was large.

"DFH-TDH at r=22 mm" shows the results of measuring the touch-down height at a 22 mm-radial position of the magnetic disk. In this event, a DFH head, as described above, was used as a magnetic head.

"Δθ50" shows the results of examining the crystal orientation of Co (002) in the magnetic film.

From these results, it is seen that the magnetic disk substrate according to this invention can be suitably used as a magnetic disk.

This invention is not limited to the above-mentioned embodiment. The substrate may be aluminum or the like instead of the glass.

The magnetic disk glass substrate according to this invention may be configured such that only one of its main surfaces has a main surface shape which is adapted for a recording surface for recording information. In this case, it is preferably configured such that the main surface only on the concave side in a cross-sectional shape along the diameter of the substrate has a main surface shape which is adapted for a recording surface for recording information. When the main surface only on the concave side (surface on the inner side of the cross-section) is used as the recording surface, the flying of a magnetic head can be stabilized to the outermost periphery as compared with a structure in which the main surface only on the convex side (surface on the outer side of the cross-section) is used as a recording surface. The following test was conducted on this point.

After manufacturing a magnetic disk by forming a magnetic film, as described above, on the magnetic disk glass substrate of Example 1, the touch-down height (TDH) was measured with respect to the main surfaces on the concave side and the convex side using DFH (dynamic fly Height) heads, respectively, under conditions of a head flying height (slider flying height) of 9 nm (the flying height of a read element was 2 nm). As a result, TDH near the outermost periphery (r=30.6 to 31.6 mm) was lower for the main surface on the concave side than for the main surface on the convex side. Further, a certification test was conducted with respect to the main surfaces on the concave side and the convex side using the DFH heads and the results were also better for the main surface on the concave side. From these results, it is seen that it is preferable to use the main surface on the concave side as a recording surface. That is, when the above-mentioned magnetic disk glass substrate is used to manufacture a magnetic disk with only one of its main surfaces serving as a recording surface, it is preferable that the main surface only on the concave side have a surface shape which is adapted for an information recording surface. Specifically, when manufacturing a magnetic disk with only one of its main surfaces serving as a recording surface, it may be configured such that the main surface only on the concave side has a surface roughness of 0.15 nm or less.

When manufacturing such a magnetic disk with only one of its main surfaces serving as the recording surface, the main surface only on the concave side may be polished in the final polishing process, for example. Further, when using only one of the main surfaces as the recording surface as described above, only this main surface may be polished using a single wafer type polishing machine.

The materials, sizes, processing sequences, and so on in the above-mentioned embodiment are only examples and this invention can be carried out by changing them in various ways within a range capable of exhibiting the effect of this invention. Other than that, this invention can be carried out with appropriate changes within a range not departing from the object of this invention.

| Description of Symbols | |
|---|---|
| 11 | circular hole |
| 12 | main surface |
| 13 | inner peripheral end |
| 14 | outer peripheral end |

The invention claimed is:

1. A magnetic disk substrate having annular main surfaces, wherein the substrate is formed of a glass, has an isotropic shape with respect to an axis passing through a center of the main surfaces and, given that a direction of the axis is height, a change amount in height of at least one main surface in a radial direction is monotone increasing from an inner peripheral end to an outer peripheral end of the at least one main surface,
wherein a surface roughness of the at least one main surface is 0.15 nm or less,
wherein each of the main surfaces has a compressive stress layer as an ion exchange layer formed by ion exchange and depths of the compressive stress layers are different between the two main surfaces, and
wherein a difference in height between a highest position and a lowest position of the at least one main surface is 0.3 μm or more and 10 μm or less.

2. The magnetic disk substrate according to claim 1, wherein each main surface is highest at the inner peripheral end thereof and lowest at the outer peripheral end thereof.

3. The magnetic disk substrate according to claim 1, wherein the substrate has a bending strength of 5 kgf or more.

4. The magnetic disk substrate according to claim 1, wherein the surface roughness of the main surface only on a concave side in a cross-sectional shape along a diameter of the substrate is 0.15 nm or less.

5. The magnetic disk substrate according to claim 1, wherein the main surface only on a concave side in a cross-sectional shape along a diameter of the substrate has a surface shape which is adapted for an information recording surface for recording information.

6. A magnetic disk substrate manufacturing method for manufacturing the magnetic disk substrate according to claim 1, comprising a step of chemically strengthening an annular glass substrate and a step of polishing two main surfaces of the glass substrate chemically strengthened, wherein thicknesses of removal, by polishing, of the two main surfaces are made different from each other.

7. A magnetic disk comprising the magnetic disk substrate according to claim 1 and a magnetic layer formed on the magnetic disk substrate directly or through another layer.

8. The magnetic disk according to claim 7, wherein the main surface only on a concave side in a cross-sectional shape along a diameter of the substrate is provided with a recording layer for recording information.

9. A magnetic disk glass substrate having annular main surfaces,
wherein the substrate has an isotropic shape with respect to an axis passing through a center of the main surfaces and, given that a direction of the axis is height, in which cross-sections of the substrate surface in any perpendicular plane that passes through the center of the glass substrate are straight lines with a constant inclination and are laterally symmetrical and have the same shape,
wherein a surface roughness of the at least one main surface is 0.15 nm or less,
wherein each of the main surfaces has a compressive stress layer as an ion exchange layer formed by ion exchange and depths of the compressive stress layers are different between the two main surfaces,
wherein a difference in height between a highest position and a lowest position of the at least one main surface is 0.3 μm or more and 10 μm or less.

* * * * *